US011209788B2

(12) United States Patent
Rischar et al.

(10) Patent No.: US 11,209,788 B2
(45) Date of Patent: *Dec. 28, 2021

(54) TECHNIQUES FOR IMPROVING INDUSTRIAL CONTROL SYSTEMS

(71) Applicant: Rockwell Automation Technologies, Inc., Mayfield Heights, OH (US)

(72) Inventors: Charles M. Rischar, Chardon, OH (US); Ladislav Bumbalek, Chrastava (CZ); Filip Macurek, Hostavice (CZ); Michael Viste, Grafton, WI (US); Petr Pitrinec, Cerveny Kostelec (CZ)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,238

(22) Filed: Apr. 10, 2020

(65) Prior Publication Data

US 2020/0241495 A1  Jul. 30, 2020

Related U.S. Application Data

(62) Division of application No. 15/935,696, filed on Mar. 26, 2018, now Pat. No. 10,671,041, which is a
(Continued)

(51) Int. Cl.
*G05B 19/042* (2006.01)

(52) U.S. Cl.
CPC ....... *G05B 19/0426* (2013.01); *G05B 19/042* (2013.01)

(58) Field of Classification Search
CPC .................. G05B 19/042; G05B 19/0426
(Continued)

(56) References Cited

U.S. PATENT DOCUMENTS

| 7,555,706 B2 * | 6/2009 | Chapman ............... G05B 15/02 715/234 |
| 9,958,848 B2 | 5/2018 | Rischar et al. |

(Continued)

FOREIGN PATENT DOCUMENTS

| CN | 1580994 A | 2/2005 |
| CN | 101563671 A | 10/2009 |

OTHER PUBLICATIONS

Viktor Schiffer; The Common Industrial Protocol (CIP™) and the Family of CIP Networks; Publication No. PUB00123R0; Entire Document pp. 1-92; Copyright © 2006 Open DeviceNet Vendor Association, Inc. (ODVA). Ann Arbor, MI—(92) pages.
(Continued)

*Primary Examiner* — Chun Cao
(74) *Attorney, Agent, or Firm* — Boyle Fredrickson, SC (57) ABSTRACT

Systems are provided for a "loadable module" architecture for industrial controllers in which new control program modules which provide updated functions or features may be loaded to extend or modify the underlying operating system and/or other services without updating the firmware and without disrupting or otherwise compromising the ability of the industrial controller to maintain continuous control over the controlled process. Control program modules and libraries may be delivered to the industrial controller in object code format and an embedded linker in the industrial controller may be used to efficiently create fully linked and executable files locally. Loadable libraries may be provided to the industrial controller during runtime to extend functionality and/or provide desired fixes. As a result, a system is provided that is more efficient and that enables significant flexibility in adding new capabilities.

18 Claims, 6 Drawing Sheets

Related U.S. Application Data division of application No. 14/626,058, filed on Feb. 19, 2015, now Pat. No. 9,958,848.

(58) Field of Classification Search
USPC .......................................................... 700/87
See application file for complete search history.

(56) References Cited

U.S. PATENT DOCUMENTS

| | | |
|---|---|---|
| 10,108,183 B2 | 10/2018 | Kambe et al. |
| 10,372,107 B2 | 8/2019 | Majewski et al. |
| 10,671,041 B2 * | 6/2020 | Rischar ................ G05B 19/042 |
| 2007/0132779 A1 | 6/2007 | Gilbert et al. |
| 2008/0189638 A1 | 8/2008 | Mody et al. |
| 2011/0258262 A1 | 10/2011 | Bezdicek et al. |
| 2012/0272215 A1 | 10/2012 | Chouinard et al. |
| 2014/0129182 A1 | 5/2014 | Weatherhead et al. |
| 2017/0214541 A1 | 7/2017 | Brun et al. |

OTHER PUBLICATIONS

Siemens AG; Simatic—Process Control System PCS 7 V7.0 SP 1 Fault-tolerant Process Control System; A5E00783452-02; Cofiguration Manual retrieved from the internet; pp. 1-226; Sep. 2007—(226) pages.
Extended European Search Report dated Sep. 20, 2016; European Patent Application No. 16152500.1—(9) pages.
Michael Wahler et al. "Reconciling flexibility and robustness in industrial automation systems, and living happily ever after." In Emerging Technologies & Factory Automation (ETFA), 2013 IEEE 18th Conference on, pp. 1-8. IEEE, 2013—(8) pages.
European Patent Examination Report dated May 15, 2017; European Patent Application No. 16152500.1—(7) pages.

\* cited by examiner

| | ID | SEC. | DEP. | CHECK |
|---|---|---|---|---|
| A1 | | | | |
| A2 | | | | |
| A3 | | | | |

| VIRTUAL_ADDR | PHYS. ADDR. | CIP CONN. | FUNC. | INSTR. |
|---|---|---|---|---|
| | | | | |
| | | | | |
| | | | | |
| | | | | |
| | | | | |

TECHNIQUES FOR IMPROVING INDUSTRIAL CONTROL SYSTEMS

CROSS-REFERENCE TO RELATED APPLICATION(S)

This application is a division of U.S. patent application Ser. No. 15/935,696, filed on Mar. 26, 2018, entitled "Techniques for Improving Industrial Control Systems," which is a division of U.S. patent application Ser. No. 14/626,058, filed on Feb. 19, 2015, entitled "Techniques for Improving Industrial Control Systems," the entireties of each of which are incorporated herein by reference.

BACKGROUND OF THE INVENTION

The present invention relates to industrial control systems, and, in particular, to techniques for improving industrial control systems.

Industrial controllers are special purpose computers used for controlling factory automation and the like. Under the direction of stored programs, a processor of the industrial controller examines a series of inputs reflecting the status of a controlled process and changes outputs affecting control of the controlled process. The stored control programs may be continuously executed in a series of execution cycles, executed periodically, or executed based on events.

The inputs received by the industrial controller from the controlled process and the outputs transmitted by the industrial controller to the controlled process are normally passed through one or more input/output (I/O) modules which serve as an electrical interface between the controller and the controlled process. The inputs and outputs are recorded in an I/O data table in processor memory as control level data. Input values may be asynchronously read from the controlled process by specialized circuitry. Output values are written directly to the I/O data table by the processor, and then communicated to the controlled process by the specialized communications circuitry. The industrial controller may accordingly interact with the controlled process via sensors and actuators in the controlled process environment.

In contrast to more conventional computer systems, industrial control systems generally provide for a more rugged construction resistant to environmental contamination. In addition, industrial control systems normally provide a modular architecture providing greater flexibility and hardware configuration (to match a variety of different control applications), often including distributed processing of multiple programs. In this regard, an industrial control system may be assembled among multiple programmable controllers connected to an arbitrary number of I/O modules (generally hardened and fault tolerant hardware).

The various components of the industrial control system may be connected together by means of a high-speed "control network" using a variety of special protocols that ensure predictable, timely and reliable communication of control data. A number of different control networks commonly used in the industrial controller art include, for example, ControlNet, DeviceNet, and EtherNet/IP, whose specifications are published and whose protocols are used broadly by a number of manufacturers and suppliers.

Control networks also typically employ a protocol for "connected messaging" in which the bandwidth of the network and buffer space is pre-allocated to dedicated "connections" to specific hardware elements to prevent lost, unpredictably delayed data transfer, or misdirected data transfer that can occur in standard network protocols such as Ethernet alone. Examples of connected messaging include Common Industrial Protocol ("CIP") connected messaging, including as described in "The Common Industrial Protocol (CIP™) and the Family of CIP Networks," Publication Number PUB00123R0, Copyright 2006, which is hereby incorporated by reference in its entirety.

In the typical implementation flow, a design environment using a standalone computing device is used to create a "project" for implementing a controlled process. The design environment includes knowledge about the particular industrial controllers to be used and their specific configurations, such as their physical I/O addresses. The control program is then prepared in the design environment, compiled and linked before transfer to the industrial controllers as fully executable files delivered him this in modules. Subsequently changing the control program often entails rebuilding the control program and the firmware in the design environment and updating in the industrial controllers. The industrial controllers are therefore typically taken off-line while the updated control program and firmware are delivered resulting in costly downtime.

However, this results in certain rigidity in which the control program cannot be readily changed to accommodate changes in the industrial controllers or the controlled process. For example, a module of the control program cannot be readily moved from one industrial controller to another without breaking previously established resource connections. In addition, transferring the control program to the industrial controllers typically requires disrupting or otherwise compromising the ability of the control system to maintain continuous operation.

Some control systems permit on-line modification and addition of control program modules. However, these on-line modifications and additions are typically limited in that they can only use the exposed interface and instructions provided by the operating system. This is ordinarily a consequence of the desire to provide separation between user applications and the operating system to increase reliability of operation.

Some control systems also allow users to build their own "instructions." However, these instructions are also typically limited in that they can only use the exposed interface and instructions provided by the operating system.

It is also known in other systems to use "virtualization" to provide additional capabilities. Virtualization allows multiple instances of operating systems or services to operate independently on one hardware platform. However, virtualization typically requires significantly more memory and processing ability to run effectively as each virtual environment has its own copy of operating system services. Moreover, in virtualization, services in different virtual environments generally cannot directly interact.

What is needed is an industrial control system that provides increased efficiency and flexibility without the drawbacks of the prior art.

SUMMARY OF THE INVENTION

The present invention provides a "loadable module" architecture for industrial controllers in which new control program modules which provide updated functions or features may be loaded to extend or modify the underlying operating system and/or add or modify other services that are part of the industrial controller without updating the firmware and without disrupting or otherwise compromising the ability of the industrial controller to maintain continuous control over the controlled process. Control program modules and libraries may be delivered to the industrial controller in object code format and an embedded linker in the industrial controller may be used to efficiently create fully linked and executable files locally. Loadable control modules, service modules, and libraries can bind to and use hardware, firmware and/or operating system resources of the industrial controller. Loadable libraries may be provided to the industrial controller during runtime to extend functionality and/or provide desired fixes. As a result, a system is provided that is more efficient and that enables significant flexibility in adding new capabilities.

A loadable module manager component may be used to determine if the module can be safely loaded, removed and/or replaced without impact to the operation of the control system and without impact to the equipment that is being controlled. The manager component may identify and manage dependencies on other modules, including facilitating newly loaded modules to locate and bind to other modules on which it depends and handle rebinding as modules are replaced or removed. Accordingly, multiple versions of a loadable module may also be provided to enable incremental changes, or other migration, to a newer version of a control or service module by re-binding to a newer version. The manager component may also take a module out of service or to place it into service, handle the orderly startup and shutdown of loadable modules, and restart failed modules independent from other modules.

The manager component may also ensure that other modules on which the loaded module is dependent upon are present and operational, and that the loaded module meets admissibility criteria. Admissibility criteria may include CPU usage, memory usage and scheduling criteria such as the required response and or execution times, resource locking and sharing information, and usage of other hardware and software resources. Admissibility criteria may also include managing licensing rights to the loaded module, and ensuring compatible software versions are in place. Accordingly, admissibility criteria may ensure that new loaded modules do not compromise real time control capabilities of the control system.

An embedded linker in the industrial controller may perform binding of application code to existing application resources right in the industrial controller. Accordingly, an embedded linker removes the knowledge requirement of where hardware components are located, and their configurations, from the design environment, thereby simplifying the design process and increasing flexibility. This approach also leverages open formats, such as Executable Linking Format (ELF) files, C/C++ libraries, and so forth, for compatibility with other tools and environments not traditionally used in the industrial controller art. In addition, execution of applications may be loaded, linked and started from a flash card, USB, or other portable media and without the need for additional software tools.

Loadable libraries also enable incremental additions of new functions, instructions, and so forth, to industrial controllers; even at run time, and without requiring firmware updates. Libraries containing functions can be used by other libraries, and by application code and at different levels, such as: run time libraries; extensions to operating systems; utility libraries, such as libraries containing functions for debugging; vendor libraries for shared functions and interfaces; vendor basic instruction libraries and extension libraries; third party libraries; and user libraries. Loadable libraries may also employ hierarchy, as functions from one library may be built on top of another library or libraries.

Libraries may be linked with other libraries and the industrial controller firmware as a part of loading library process, and may be statically bound for optimum performance. Libraries may also be replaced with newer versions, without disrupting currently executing control application code, while new capabilities are added. Libraries may share execution code contained in the library among different libraries and modules. Libraries may be uniquely identified, potentially having a revision, description, and so forth, and identification of their functions. Multiple versions of libraries may be present at the same time, enabling migration to a newer version of a library, or to satisfy dependencies of different loadable modules or other libraries on different versions of a library. Libraries may also have security and license management aspects, including being "signed" for authentication, requiring a certificate for deployment or loading. Different rights/certificates may be required to run the library accordingly. Libraries may be provided in the ELF format, thereby supporting an open and well known architecture.

In accordance with an embodiment, an industrial controller comprises a processor executing: an operating system stored in non-transient memory for managing hardware components of the industrial controller; a first application module stored in non-transient memory for controlling at least a portion of a controlled process via the operating system; and a loadable module manager stored in non-transient memory configured to receive a second application module. The loadable module manager may be further configured to identify a dependency of the second application module and bind the second application module to a resource of the industrial controller to resolve the dependency. The second application module may be configured to extend or modify at least a portion of the operating system while the first application module controls the at least a portion of the controlled process.

The operating system may be configured to communicate with firmware before managing the hardware components, and the second application module may be configured to extend or modify the at least a portion of the operating system without modification to the firmware.

It is thus a feature of at least one embodiment to provide an update to the control program without changing the firmware.

The loadable module manager may be further configured to determine whether an installation requirement is met before the second application module is permitted to extend or modify the at least a portion of the operating system.

It is thus a feature of at least one embodiment to set forth criteria for verification before modifying the control program.

The industrial controller may further comprise an embedded linker stored in non-transient memory configured to receive an object file containing symbolic references. The embedded linker may be further configured to bind the symbolic references to resources of the industrial controller to produce a third application module for controlling at least a portion of a controlled process.

It is thus a feature of at least one embodiment to provide linking capability in the industrial controller, as opposed to the design environment, to increase flexibility of the control system.

The industrial controller may further comprise a library manager stored in non-transient memory configured to receive a library module. The library manager may be configured to identify a dependency of the library module and bind the library module to a resource of the industrial controller to resolve the dependency.

It is thus a feature of at least one embodiment to flexibly provide new libraries to the industrial controller in addition to application modules.

In accordance with another embodiment, an industrial controller comprises a processor executing: an operating system stored in non-transient memory for managing hardware components of the industrial controller; and an embedded linker stored in non-transient memory configured to receive an object file containing symbolic references. The embedded linker is further configured to bind the symbolic references of the object file to resources of the industrial controller to produce an application module for controlling at least a portion of a controlled process.

In accordance with another embodiment, an industrial controller comprises a processor executing: an operating system stored in non-transient memory for managing hardware components of the industrial controller; an application module stored in non-transient memory for controlling at least a portion of a controlled process; a first library module stored in non-transient memory for providing information used by the application module; and a library manager stored in non-transient memory configured to receive a second library module. The library manager is further configured to identify a dependency of the second library module and bind the library to a resource of the industrial controller to resolve the dependency. The application module is configured to control the at least a portion of the controlled process while the library manager binds the second library module to the resource of the industrial controller.

These particular objects and advantages may apply to only some embodiments falling within the claims and thus do not define the scope of the invention.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Figure 1:
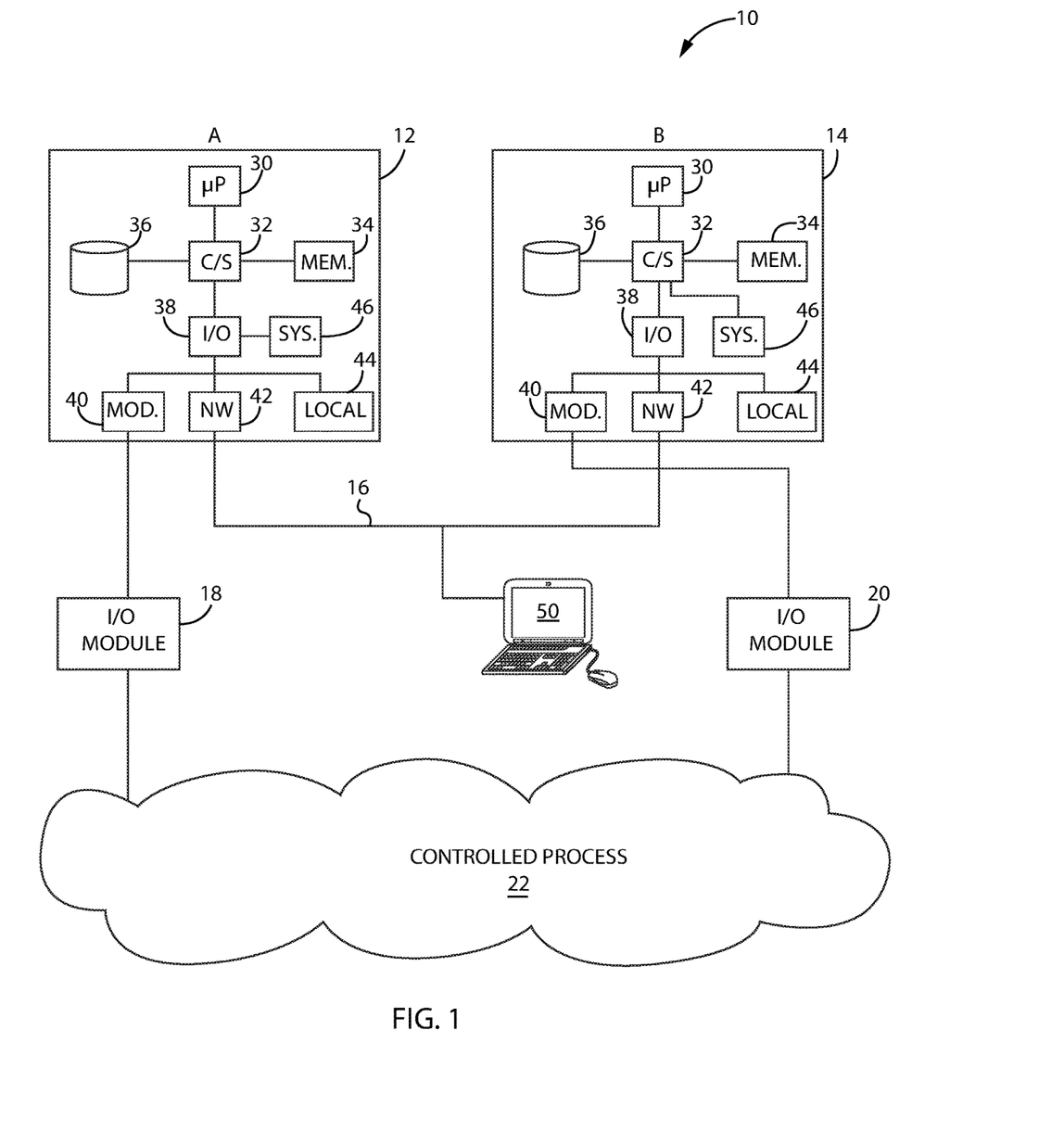
FIG. 1 is a diagram illustrating hardware components of an exemplar industrial control system in accordance with an embodiment of the invention.

Referring now to FIG. 1, a diagram illustrating hardware components of an exemplar industrial control system 10 is provided in accordance with an embodiment of the invention. A first industrial controller 12, hereinafter referred to as "A," and a second industrial controller 14, hereinafter referred to as "B," are connected together via a control network 16, which may be an EtherNet/IP network or other control network and which may implement Common Industrial Protocol (CIP). The industrial controllers A and B may be Programmable Logic Controllers (PLC's), though additional controllers and other types and combinations of controllers may also be used as generally understood.

The industrial controllers A and B each, in turn, connect to I/O Modules 18 and 20, respectively. The I/O Modules 18 and 20 may be implemented in separate hardware or may be integrated within the industrial controllers A and B. The I/O Modules 18 and 20, in turn, connect to varying aspects of a controlled process 22, such as via sensors and actuators, thereby allowing the industrial controllers A and B to control the controlled process 22.

Hardware components of the industrial controllers A and B may each include, for example, a processor 30; system chipset 32 for interfacing with a memory 34 and a disk 36 or other form of non-volatile storage, including but not limited to Flash memory and/or solid state drives; an I/O chipset 38 for interfacing with a controlled process hardware element 40 (allowing connection and communication with the one or more I/O Modules), a control network interface element 42 (allowing connection and communication with the control network 16 and/or other networks), and a local interface element 44 (allowing connection and communication with a Human Machine Interface (HMI) and local I/O, such as a keyboard, mouse, video display, CD/DVD, Flash card, USB or other portable media I/O); and system hardware 46, which may provide various known system functions, including power supply logic, a Real Time Clock (RTC), and so forth. The actual hardware of the industrial controllers A and B will differ, perhaps slightly, such as differing only in terms of serial numbers, or more significantly, such as differing with respect to entire hardware and/or software architectures.

Also connected to the control network 16 is an electronic computer 50. The electronic computer 50 provides an HMI with a keyboard, mouse and video display. Accordingly, the electronic computer 50 may provide a design environment to create, modify and/or update a project implementing the controlled process 22. In other embodiments, the electronic computer 50 may connect and communicate with the industrial controllers A and B over a separate network, or the functionality of the electronic computer 50 may be carried out within either of the industrial controllers A and B. In addition, source code may be loaded and then compiled natively within the industrial controller. Accordingly, source code modules may be delivered and then compiled and linked to create resulting object modules within the industrial controller.

Figure 2:
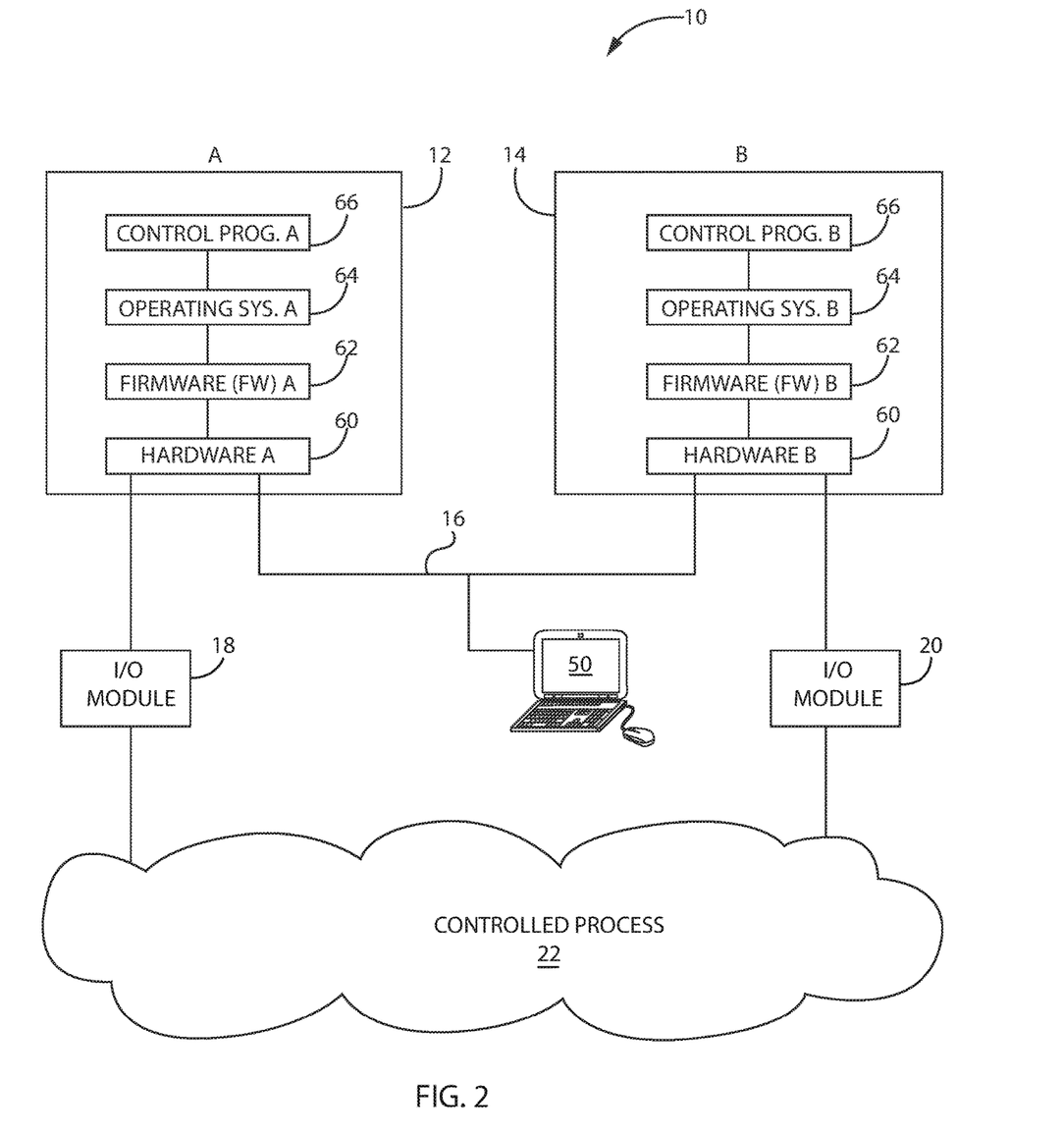
FIG. 2 is a diagram illustrating possible industrial control system architecture hierarchy in accordance with an embodiment of the invention.

Referring now to FIG. 2, a diagram illustrating a possible industrial control system architecture hierarchy for the industrial control system 10 is provided in accordance with an embodiment of the invention. The industrial controllers A and B each provide a hardware component layer 60 unique to the industrial controller. For example, the industrial controller A will include "Hardware A" while the industrial controller B will include "Hardware B." Hardware A may be very similar to Hardware B or significantly different.

The industrial controllers A and B also each provide a firmware layer 62 unique to the industrial controller. For example, the industrial controller A will include "Firmware A" while the industrial controller B will include "Firmware B." Similar to the hardware component layer 60, Firmware A may be very similar to Firmware B or significantly different. The firmware layer 62 will typically be stored in Flash memory held within the industrial controllers A and B, though other types of non-volatile memory may be used. The firmware layer 62 provides the lowest level of device instruction for the hardware component layer 60 of the industrial controllers A and B.

The industrial controllers A and B also each provide an operating system and services layer 64 unique to the industrial controller. For example, the industrial controller A will include "Operating System A" while the industrial controller B will include "Operating System B." Similar to the hardware component layer 60 and the firmware layer 62, Operating System A may be very similar to Operating System B or significantly different. The operating system and services layer 64 will typically be stored on disk or other non-volatile memory and accessed via memory such as RAM held in the industrial controllers A and B, though other types of non-transient memory may also be used. The operating system and services layer 64 communicates with the firmware layer 62 and provides the next lowest level of instruction for the hardware component layer 60 of the industrial controllers A and B.

Finally, the industrial controllers A and B also each provide an application or control program layer 66 unique to the industrial controller. For example, the industrial controller A will include "Control Program A" while the industrial controller B will include "Control Program B." Control Program A may be very similar to Control Program B or significantly different. The control program layer 66 will typically be stored on disk or other non-volatile memory and accessed via memory such as RAM held in the industrial controllers A and B, though other types of non-transient memory may also be used. The control program layer 66 provides the next level of instruction for the industrial controllers A and B and implements the project set forth by the computer 50. Accordingly, the control program layer 66 allows for controlling at least a portion of the controlled process 22 via the operating system and services layer 64 of the industrial controllers A and B.

Figure 3:
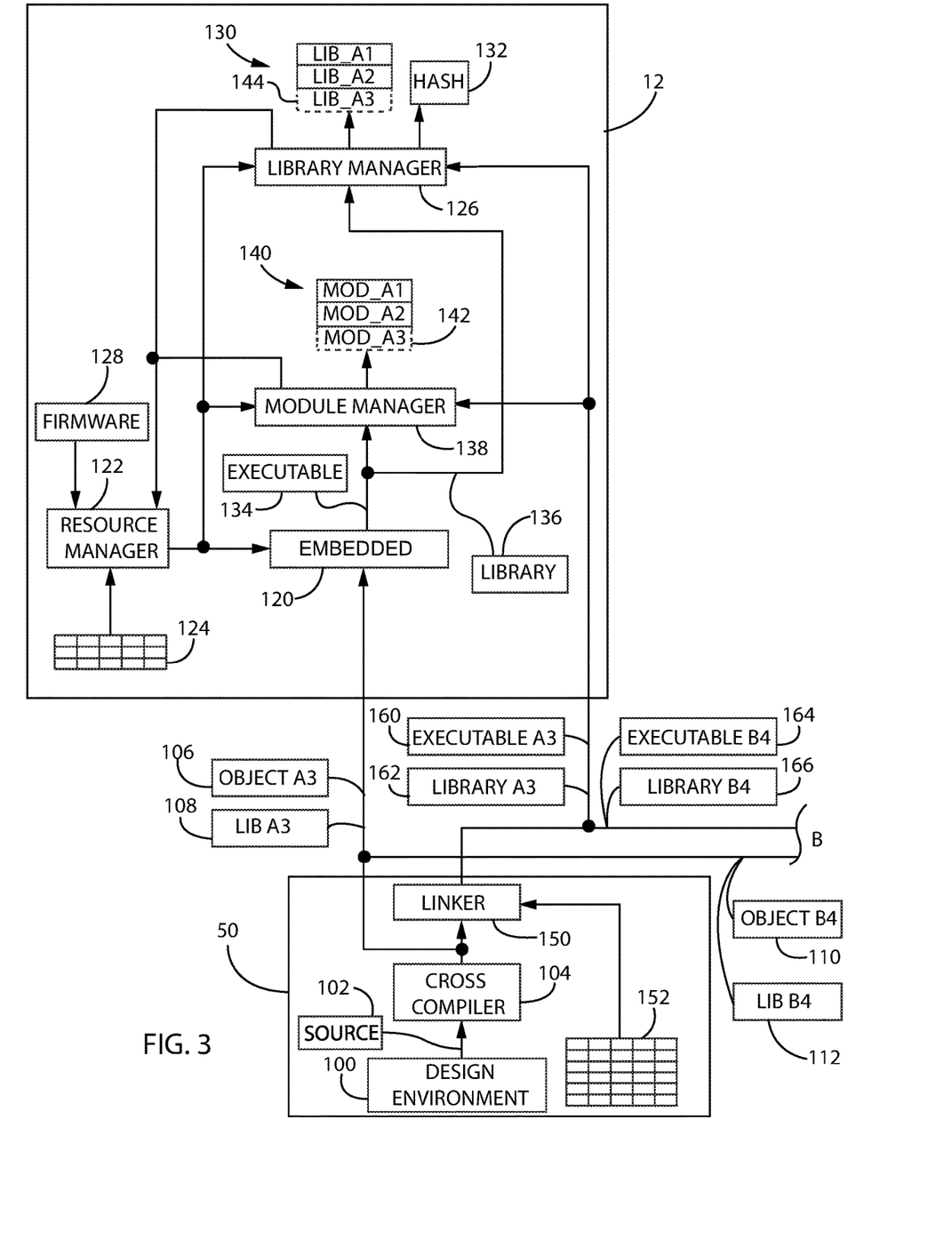
FIG. 3 is a diagram illustrating an exemplar industrial control system including a controller embedded linker and/or loader, a loadable module manager, and a library manager in accordance with an embodiment of the invention.

Referring now to FIG. 3, a diagram illustrating the industrial control system 10, including exemplar industrial controller A showing an embedded linker, loader and/or compiler, a loadable module manager, and a library manager, in accordance with an embodiment of the invention. The electronic computer 50 includes a design and configuration environment 100, such as RSLogix 5000 from Rockwell Automation, Inc. The design and configuration environment 100 may employ a graphical user interface or simply a high level computing language such as C++. The user designs, modifies and/or updates the project accordingly and produces a source module 102, which may include source application code, source library code, and/or other source data as generally understood in the art.

The source module 102 is then provided to a cross compiler 104 on the electronic computer 50. The cross compiler 104, in turn, compiles one or more versions of the source module 102, depending on the target platform requirements of the industrial controllers A and B and the project implementation requirements, and produces corresponding object code and libraries with "symbolic references." For example, the cross compiler 104 may produce a first object code 106 ("OBJECT A3") and a first library 108 ("LIB A3") targeted for the industrial controller A, and a second object code 110 ("OBJECT B4") and a second library 112 ("LIB B4") targeted for the industrial controller B. Object files may be produced in a standard format, such as Executable Linking Format (ELF) files, and may include breakpoints or other schemes for allowing subsequent debug operations, including as described in U.S. Pat. No. 7,353, 508 to Bowers et al., the contents of which are hereby incorporated by reference in its entirety.

In an embodiment, the electronic computer 50 may then transfer the object code and libraries to the targeted industrial controllers. For example, the first object code 106 ("OBJECT A3") and the first library 108 ("LIB A3") may be provided to an embedded linker/loader/compiler 120 stored in non-transient memory in the industrial controller A. In addition, a resource manager 122 in the industrial controller A may reference a data structure 124, a library manager 126, and a local firmware 128 in the industrial controller A, and provide such resource information to the embedded linker/loader/compiler 120. The data structure 124 may be a table for identifying resources of the industrial controller A, and in some embodiments, resources of other industrial controllers in the industrial control system 10, such as industrial controller B. The library manager 126 references loaded libraries 130 in the industrial controller A (such as "LIB_A1" and "LIB_A2"), and provides information about those loaded libraries 130 to the embedded linker/loader/compiler 120. The library manager 126 may also utilize a hash table 132 of exported symbols created during library linking for increased performance. A resource may include, for example, another network interface or protocol stack, including but not limited to Transmission Control Protocol ("TCP"), User Datagram Protocol ("UDP") and the like, which may be supported by hardware and provided by the base operating system or an extension of the operating system provided by another loadable module or library.

In turn, the embedded linker/loader/compiler 120 binds the symbolic references of the object code and libraries, such as the first object code 106 ("OBJECT A3") and the first library 108 ("LIB A3"), to resources of the industrial controller. Accordingly, the embedded linker/loader/compiler 120 produces fully linked and executable application and library modules, such as application module 134 ("EXECUTABLE") and library module 136 ("LIBRARY"). In addition, the embedded linker/loader/compiler 120 may allow source the industrial controller 12 to compile modules. Accordingly, source modules, as well as executable and object files, may be loaded. Also, the embedded linker/loader/compiler 120 may be further configured to attempt to bind an application module to a resource following an unsuccessful attempt to bind the application module.

Next, a loadable module manager 138 stored in non-transient memory in the industrial controller A receives the fully linked and executable application module, such as application module 134 ("EXECUTABLE"). The loadable module manager 138, in turn, identifies one or more dependencies of the application module 134 ("EXECUTABLE"), such as a tag name or other variable, and binds the application module 134 ("EXECUTABLE") to a resource of the industrial controller A to resolve the dependencies, such as binding to another application module among loaded application modules 140, or a physical or virtual memory address, or binding to a resource of an another industrial controller in the industrial control system 10, such as a resource of industrial controller B. A tag name may refer to a data value in the control system memory which represents an aspect of the state of the equipment being controlled or the control application itself. Accordingly, the loadable module manager 138 binds and places the application module 134 ("EXECUTABLE") into service among the loaded application modules 140 as a running application module 142 ("MOD_A3"). The running application module 142 ("MOD_A3") may, in turn, extend or modify at least a portion of the operating system while one or more of the loaded application modules 140 continues to control the controlled process.

Similarly, the library manager 126 receives the fully linked library module, such as the library module 136 ("LIBRARY"). The library manager 126, in turn, identifies one or more dependencies of the library module 136 ("LIBRARY"), such as a tag name or other variable, and binds the library module 136 ("LIBRARY") to a resource of the industrial controller A to resolve the dependencies, such as binding to another library among the loaded libraries 130 in the industrial controller A, or binding to a resource of an another industrial controller in the industrial control system 10, such as a resource of industrial controller B. Accordingly, the library manager 126 binds and places the library module 136 ("LIBRARY") into service among the loaded libraries 130 as a running library 144 ("LIB_A3"). One or more of the loaded application modules 140 may continue to control the controlled process while the library manager 126 binds the library module 136 ("LIBRARY") to the resource.

In another embodiment, the electronic computer 50 may instead transfer the object code and libraries to a design environment linker 150. For example, the first object code 106 ("OBJECT A3"), the first library 108 ("LIB A3"), the second object code 110 ("OBJECT B4") and the second library 112 ("LIB B4") may be provided to the design environment linker 150 in the electronic computer 50. In addition, the design environment linker 150 may reference a design environment data structure 152. The design environment data structure 152 may be a table for identifying resources of the industrial controllers A and B.

In turn, the design environment linker 150 binds the symbolic references of the object code and libraries, such as the first object code 106 ("OBJECT A3"), the first library 108 ("LIB A3"), the second object code 110 ("OBJECT B4") and the second library 112 ("LIB B4"), to resources of the industrial controllers A and B. Accordingly, the design environment linker 150 produces fully linked and executable application and library modules for the industrial controllers A and B, such as application module 160 ("EXECUTABLE A3") and library module 162 ("LIBRARY A3") for industrial controller A, and application module 164 ("EXECUTABLE B4") and library module 166 ("LIBRARY B4") for industrial controller B.

Next, the loadable module manager 138 receives the fully linked and executable application module, such as application module 160 ("EXECUTABLE A3"). The loadable module manager 138, in turn, identifies one or more dependencies of the application module 160 ("EXECUTABLE A3"), such as a tag name or other variable, and binds the application module 160 ("EXECUTABLE A3") to a resource of the industrial controller A to resolve the dependencies, such as binding to another application module among loaded application modules 140, or a physical or virtual memory address, or binding to a resource of an another industrial controller in the industrial control system 10, such as a resource of industrial controller B. Accordingly, the loadable module manager 138 binds and places the application module 160 ("EXECUTABLE A3") into service among the loaded application modules 140 as a running application module 142 ("MOD_A3"). The running application module 142 ("MOD_A3") may, in turn, extend or modify at least a portion of the operating system while one or more of the loaded application modules 140 continues to control the controlled process.

Similarly, the library manager 126 receives the fully linked library module, such as the library module 162 ("LIBRARY A3"). The library manager 126, in turn, identifies one or more dependencies of the library module 162 ("LIBRARY A3"), such as a tag name or other variable, and binds the library module 162 ("LIBRARY A3") to a resource of the industrial controller A to resolve the dependencies, such as binding to another library among the loaded libraries 130 in the industrial controller A, or binding to a resource of an another industrial controller in the industrial control system 10, such as a resource of industrial controller B. Accordingly, the library manager 126 binds and places the library module 162 ("LIBRARY A3") into service among the loaded libraries 130 as a running library 144 ("LIB_A3"). One or more of the loaded application modules 140 may continue to control the controlled process while the library manager 126 binds the library module 162 ("LIBRARY A3") to the resource.

Multiple versions of the a library module may be loaded. This may be useful, for example, to update a library and incrementally re-link/bind to a new version, or to satisfy the needs of application modules which may require different versions of the same library.

In another embodiment, the electronic computer 50 could transfer the object code and libraries to one industrial controller, such as the industrial controller A, and transfer at least partially linked and executable application and library modules to another industrial controller, such as the industrial controller B. In addition, the electronic computer 50 and the described "design environment" could be implemented instead by the industrial controllers A or B.

Figure 4A:
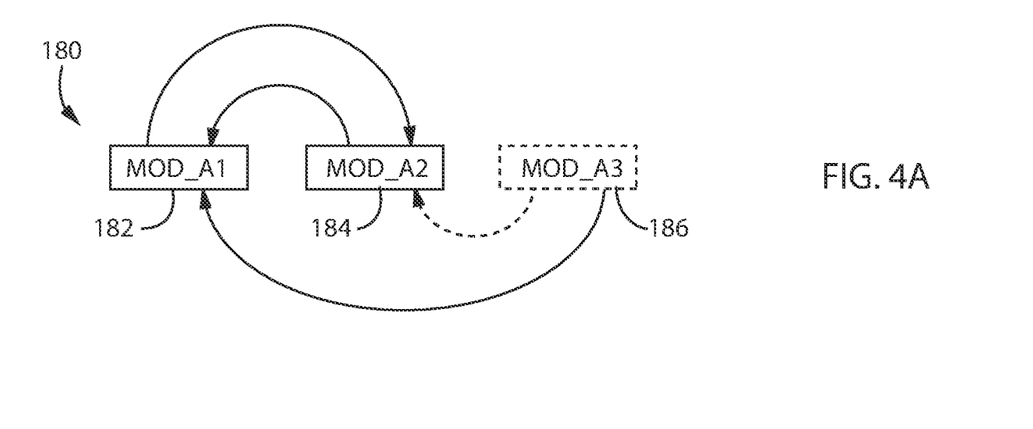
FIG. 4A is a diagram illustrating application module dependencies.
Figure 4B:
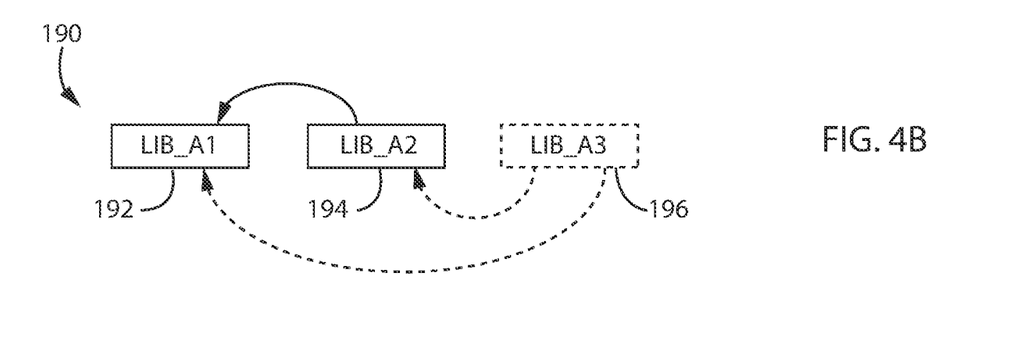
FIG. 4B is a diagram illustrating library module dependencies, each in accordance with an embodiment of the invention.

Referring now to FIGS. 4A and 4B, diagrams illustrating application and library module dependencies are provided in accordance with an embodiment of the invention. Loaded application modules 180 may include a first application module 182 ("MOD_A1") and a second application module 184 ("MOD_A2"). The first and second application modules 182 and 184 may be modules of a control program running on an industrial controller for controlling a controlled process. The first application module 182 may have a dependency on the second application module 184, and the second application module 184 may have a dependency on the first application module 182, such as tag names. Upon receiving a third application module 186 ("MOD_A3"), a loadable module manager may determine that the third application module 186 has dependencies on the first and second application modules 182 and 184, such as tag names, and may bind the third application module 186 to the first and second application modules 182 and 184 to resolve the dependencies.

Similarly, loaded library modules 190 may include a first library module 192 ("LIB_A1") and a second library module 194 ("LIB_A2"). The first and second library modules 192 and 194 may be libraries referenced by the application modules 180. The second library module 194 may have a dependency on the first library module 192, and the first library module 192 may have no dependencies at all. Upon receiving a third library module 196 ("LIB_A3"), a loadable library manager may determine that the third library module 196 has dependencies on the first and second library modules 192 and 194 and may bind the third library module 196 to the first and second library modules 192 and 194 to resolve the dependencies. The electronic computer 50 assures that all necessary libraries and control modules are loaded to the industrial controller. Also, libraries may include code compiled for different hardware architectures. The electronic computer 50 may choose to load only the portion of the library that is intended for the particular hardware of the industrial controller.

Figure 5A:
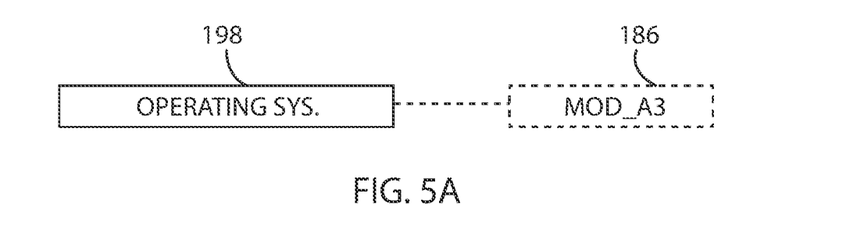
FIG. 5A is a diagram illustrating an application module configured to extend or modify at least a portion of an operating system.
Figure 5B:
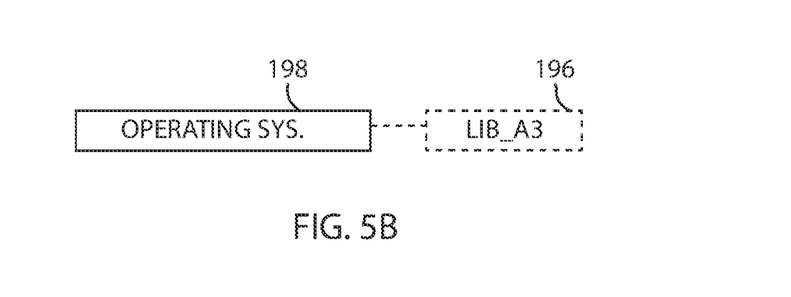
FIG. 5B is a diagram illustrating a library module configured to extend or modify at least a portion of an operating system, each in accordance with an embodiment of the invention.

Referring now to FIGS. 5A and 5B, diagrams illustrating application and library modules configured to extend or modify at least a portion of an operating system are provided in accordance with an embodiment of the invention. An operating system and services layer 198 ("Operating System A") may be extended or modified by the third application module 186 ("MOD_A3") and/or the third library module 196 ("LIB_A3").

Figure 6:
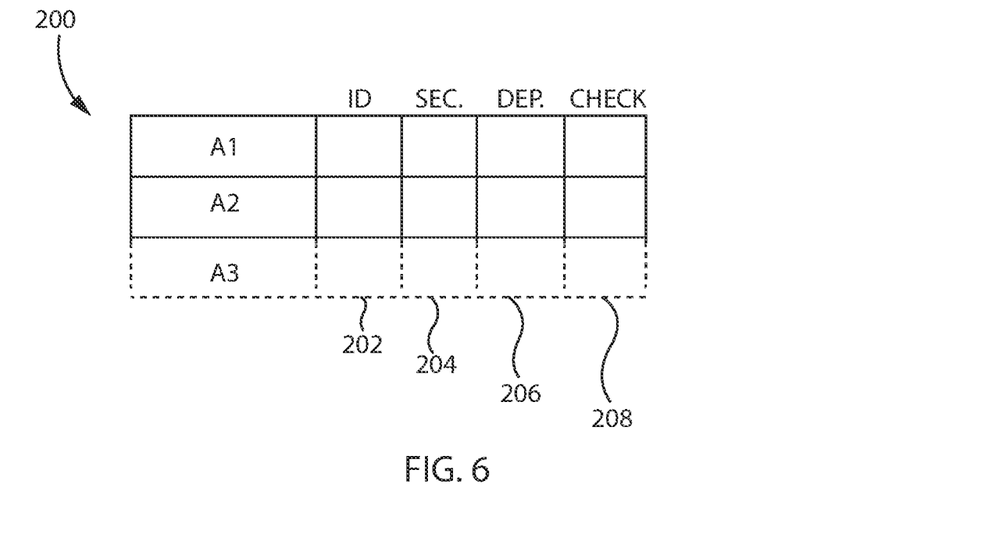
FIG. 6 is a table illustrating exemplar fields for application or library modules in accordance with an embodiment of the invention.

Referring now to FIG. 6, a table 200 illustrates exemplar fields for application or library modules in accordance with an embodiment of the invention. For multiple modules, in a first column 202, an identification or name for the module may be provided. In a second column 204, security parameters may be provided, such as authentication, licensing/permissions to run the module, an encryption key for decrypting the module, and so forth. In a third column 206, a listing of dependencies for the module on other modules or other resources may be provided, such as in the form of tag names or variables. In a fourth column 208, a cyclic redundancy check ("CRC"), checksum or other data integrity field may be provided for ensuring the integrity of the module.

Figure 7:
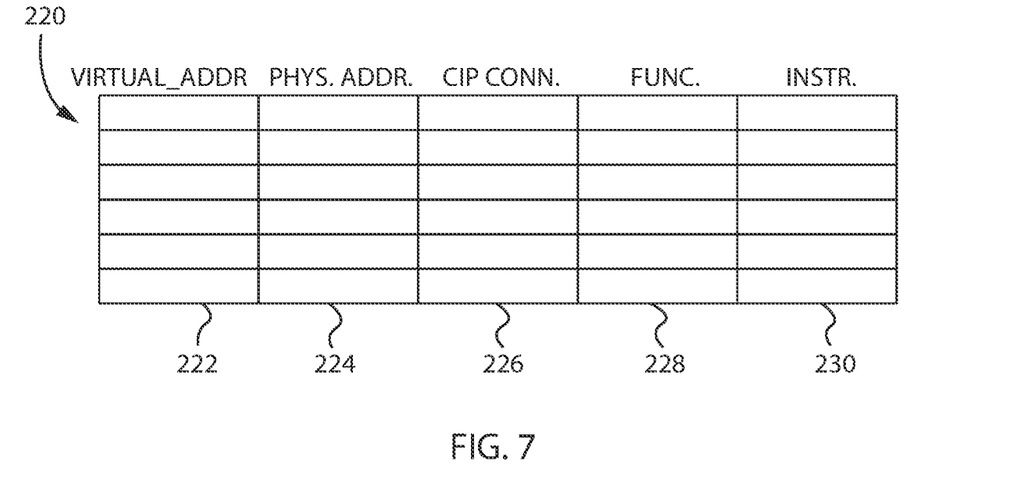
FIG. 7 is a table illustrating an exemplar data structure indentifying resources of the industrial controller in accordance with an embodiment of the invention.

Referring now to FIG. 7, a table 220 illustrates an exemplar data structure indentifying resources of an industrial controller in accordance with an embodiment of the invention. For multiple resources, in a first column 222, a virtual memory address may be provided. In a second column 224, a physical memory address may be provided. In a third column 226, a CIP connection or instance may be provided. In a fourth column 228, a function may be provided, such as a function stored in an application or library module. In a fifth column 230, an instruction may be provided, such as an instruction stored in an application or library module. In alternative embodiments, resource information in the table 220 may be held and or referenced according to other storage and retrieval mechanisms as known in the art, including databases, pointers, hash tables, and so forth.

Figure 8:
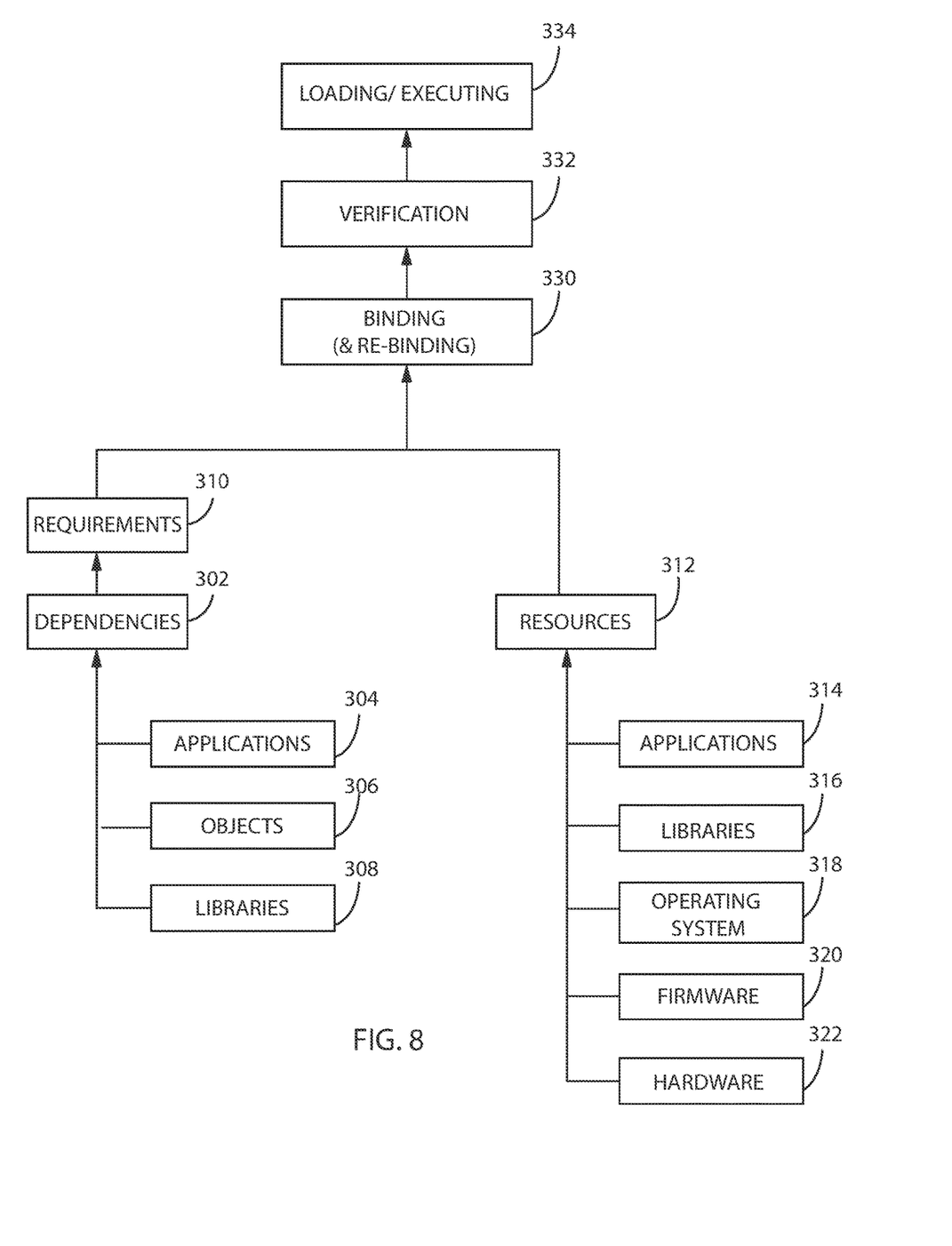
FIG. 8 is a flow chart illustrating identification of dependencies and binding to resources to resolve the dependencies in accordance with an embodiment of the present invention.

Referring now to FIG. 8, a flow chart 300 illustrating identification of dependencies and binding to resources to resolve the dependencies is provided in accordance with an embodiment of the present invention. A first block 302 may comprise multiple dependencies which may exist in control program application modules 304, object files 306 and/or library modules 308.

In a second block 310, the industrial controller may determine whether one or more installation requirements are met for the underlying module or file before proceeding further. If an installation requirement is not met, the industrial controller can prevent the underlying module or file with dependencies from proceeding further. Installation requirements may be based on current or anticipated processor usage, memory usage and/or run time scheduling needs; authorization to run the module or file, such as licensing permissions; prior installation of proper software versions of other modules, libraries or files, or of the operating system or firmware; having a plurality of software versions of other modules, libraries or files, or of the operating system or firmware (which may allow, for example, supporting two versions of the same service to facilitate updating to fix a problem or add capability, and/or enable external clients which may require different versions of the same service); a correct CRC, checksum or other data integrity calculation; and so forth.

In a third block 312, multiple resources which may exist in the industrial controller, or which may be known by the industrial controller to exist in the industrial control system, are determined. The resources may include other control program application modules 314, other library modules 316, the industrial controller's operating system and services 318, the industrial controller's local firmware 320 and the industrial controller's hardware 322.

Having identified dependencies according to the first block 302, and having verified installation requirements according the second block 310, and having knowledge of resources according to the third block 312, in a fourth block 330, the industrial controller resolves the dependencies by binding the dependencies of the first block 302 to the resources of the third block 312. In some embodiments, this may further include "re-binding" one or more subsequent times based on continuing updates, system changes, and so forth.

Next, in a fifth process block 332, the industrial controller may proceed to verify that all resources have been correctly bound to ensure accuracy and completeness. For example, the industrial controller may execute a built in self-test or other diagnostic to ensure binding of all dependencies to proper resources.

Finally, in a sixth process block 334, the fully bound modules are loaded and executed. The entire flow may repeat as additional modules or files are provided while the industrial controller continues to control a controlled process. Accordingly, dependencies in the first block 302, and resources in the third block 312, may be continuously identified, and binding/re-binding in the fourth block 330 may continue to occur.

Certain terminology is used herein for purposes of reference only, and thus is not intended to be limiting. Such terminology may include the words specifically mentioned above, derivatives thereof, and words of similar import. For example, the terms "first," "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An industrial controller providing factory automation by controlling an industrial controlled process, comprising:
   a processor executing:
   an operating system stored in non-transient memory, the processor executing the operating system to manage hardware components of the industrial controller, the hardware components including a chipset interfacing with hardware for allowing control of the controlled process;
   an application program stored in non-transient memory, the processor executing the application program to control at least a portion of the controlled process;
   a first library program stored in non-transient memory, the processor executing the first library program to provide information used by the application program; and
   a library manager stored in non-transient memory, the processor executing the library manager to identify a dependency of a second library program and bind the second library program to a resource of the industrial controller to resolve the dependency,
   wherein the processor executes the application program to control the at least a portion of the controlled process while the library manager binds the second library program to the resource of the industrial controller.

2. The industrial controller of claim 1, wherein the processor further executes the operating system to communicate with firmware before managing the hardware components, and wherein the processor further executes the application program to control the at least a portion of the controlled process while executing the library manager to bind the second library program to the resource of the industrial controller without modification to the firmware.

3. The industrial controller of claim 1, wherein the processor executes the library manager to bind the second library program to at least one of the operating system and the first library program.

4. The industrial controller of claim 1, wherein the second library program is a different version of the first library program.

5. The industrial controller of claim 1, wherein the processor executes the library manager to determine whether an installation requirement is met before executing the library manager to bind the second library program to the resource of the industrial controller.

6. The industrial controller of claim 5, wherein the installation requirement is based on at least one of processor usage, memory usage and run time scheduling of the industrial controller.

7. The industrial controller of claim 5, wherein the installation requirement is based on an authorization received by the industrial controller to run the second library program.

8. The industrial controller of claim 5, wherein the installation requirement is based on a version of at least one of the operating system and the first library program.

9. The industrial controller of claim 1, further comprising an embedded linker stored in non-transient memory, wherein the processor executes the embedded linker to receive an object file containing symbolic references and to bind the symbolic references to resources of the industrial controller to produce a second application program for controlling the at least a portion of the controlled process.

10. A method for providing factory automation by controlling an industrial controlled process, comprising:
    executing an operating system to manage hardware components of an industrial controller, the hardware components including a chipset interfacing with hardware for allowing control of the controlled process;
    executing an application program to control at least a portion of the controlled process;
    executing a first library program to provide information used by the application program;
    executing a library manager to identify a dependency of a second library program and bind the second library program to a resource of the industrial controller to resolve the dependency; and
    further executing the application program to control the at least a portion of the controlled process while the library manager binds the second library program to the resource of the industrial controller.

11. The method of claim 10, further comprising executing the operating system to communicate with firmware before managing the hardware components, and wherein the processor further executes the application program to control the at least a portion of the controlled process while executing the library manager to bind the second library program to the resource of the industrial controller without modification to the firmware.

12. The method of claim 10, further comprising executing the library manager to bind the second library program to at least one of the operating system and the first library program.

13. The method of claim 10, further comprising providing the first and second library programs with different versions from one another.

14. The method of claim 10, further comprising executing the library manager to determine whether an installation requirement is met before executing the library manager to bind the second library program to the resource of the industrial controller.

15. The method of claim 14, further comprising basing the installation requirement on at least one of processor usage, memory usage and run time scheduling of the industrial controller.

16. The method of claim 14, further comprising basing the installation requirement on an authorization received by the industrial controller to run the second library program.

17. The method of claim 14, further comprising basing the installation requirement on a version of at least one of the operating system and the first library program.

18. The method of claim 10, further comprising executing an embedded linker to receive an object file containing symbolic references and to bind the symbolic references to resources of the industrial controller to produce a second application program for controlling the at least a portion of the controlled process.

\* \* \* \* \*